June 19, 1934.　　　C. A. BLUME　　　1,963,461
AEROPLANE
Filed June 20, 1933　　　3 Sheets-Sheet 1

Charles A. Blume Inventor
By C. A. Snow & Co.
Attorneys.

June 19, 1934.  C. A. BLUME  1,963,461
AEROPLANE
Filed June 20, 1933  3 Sheets-Sheet 2
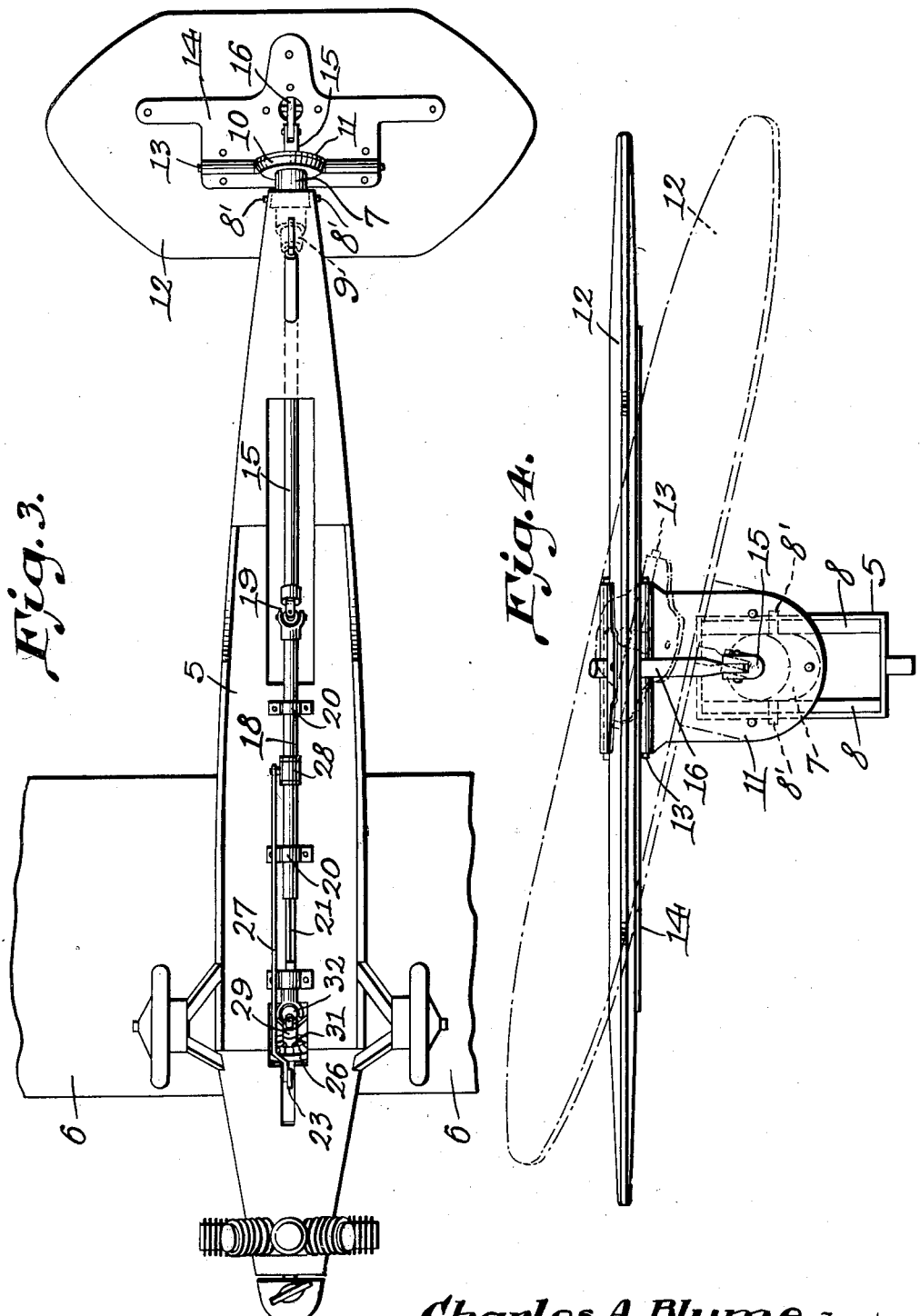
Charles A. Blume Inventor
By C. A. Snow & Co.
Attorneys.

June 19, 1934. C. A. BLUME 1,963,461
AEROPLANE
Filed June 20, 1933 3 Sheets-Sheet 3
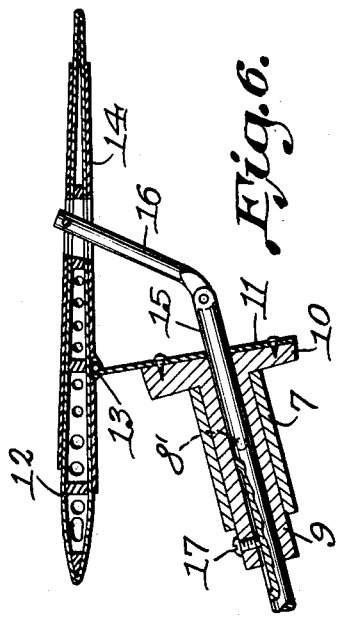
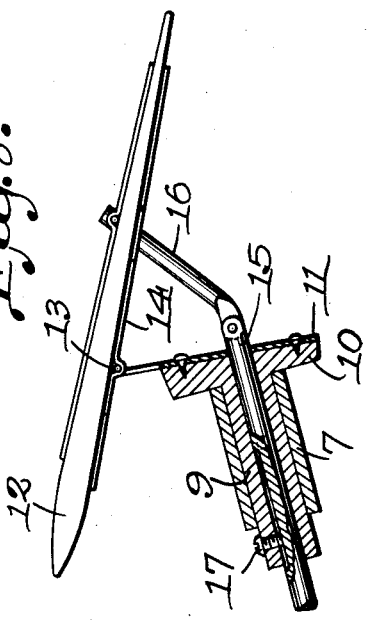
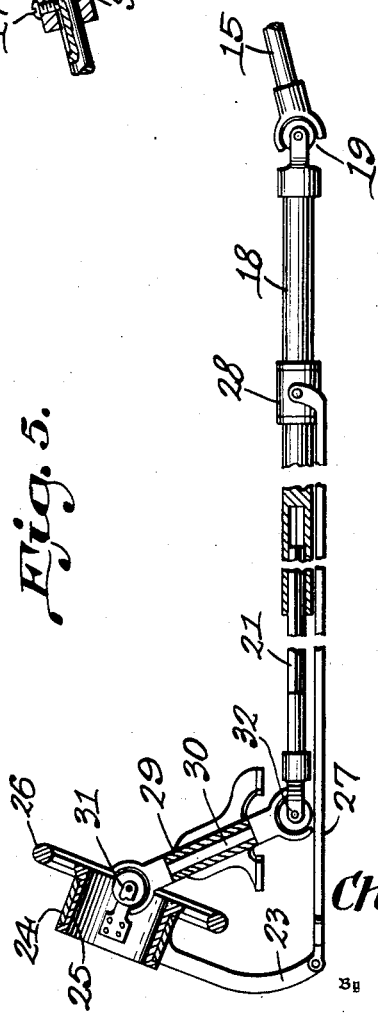
Charles A. Blume Inventor Patented June 19, 1934

1,963,461

UNITED STATES PATENT OFFICE 1,963,461

AEROPLANE

Charles A. Blume, Centerville, Ind.

Application June 20, 1933, Serial No. 676,718

3 Claims. (Cl. 244—29)

This invention relates to aeroplanes and more particularly to the construction and operation of the stabilizer thereof.

The primary object of the invention is the provision of a stabilizer capable of pivotal movement in a vertical plane, as well as pivotal movement in a horizontal plane, thereby greatly simplifying the control of aeroplanes.

Another important object of the invention is the provision of a control wheel mounted in such a way that rotary movement thereof will tilt the stabilizer laterally while forward or rearward pivotal movement of the wheel will act to change the pitch of the stabilizer, to control the movements of the aeroplane.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is a bottom plan view of the aeroplane.

Figure 4 is an enlarged detail view of the stabilizer, the stabilizer being shown in dotted lines as tilted laterally.

Figure 5 is a detail view of the operating mechanism.

Figure 6 is a sectional view through the stabilizer.

Figure 7 is an elevational view of the stabilizer, the tubular bearing for the operating rod, being shown in section.

Figure 8 is an elevational view similar to Figure 7, except the stabilizer has been moved to direct the aeroplane downwardly.

Figure 1:
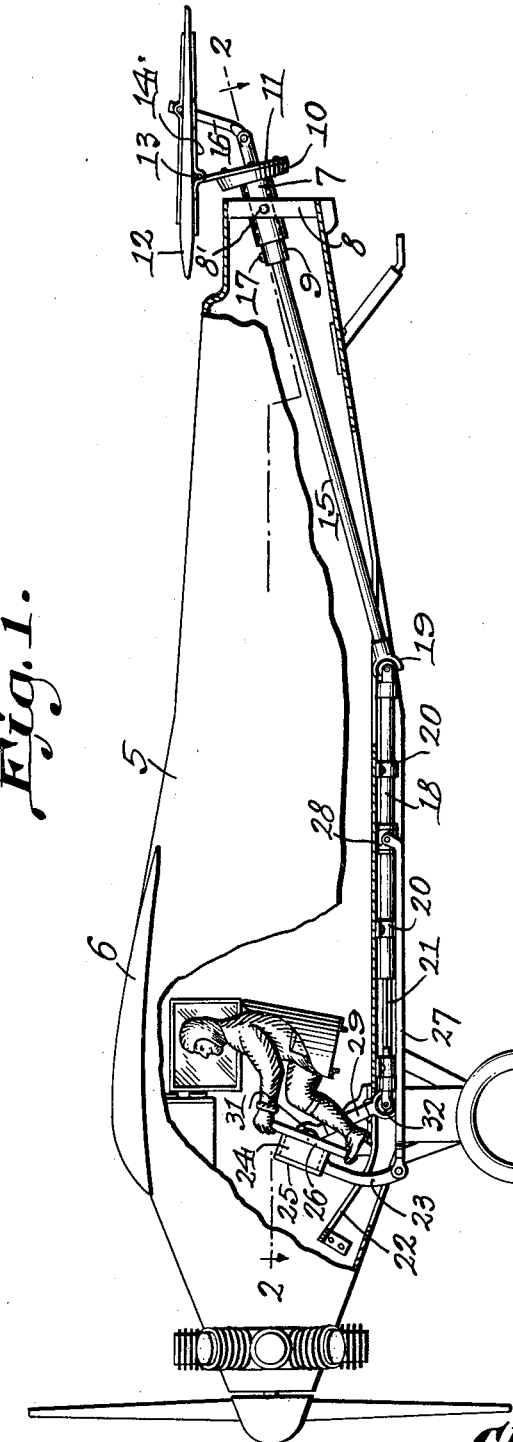
Figure 1 is a sectional view through an aeroplane equipped with a stabilizer constructed in accordance with the invention.
Figure 2:
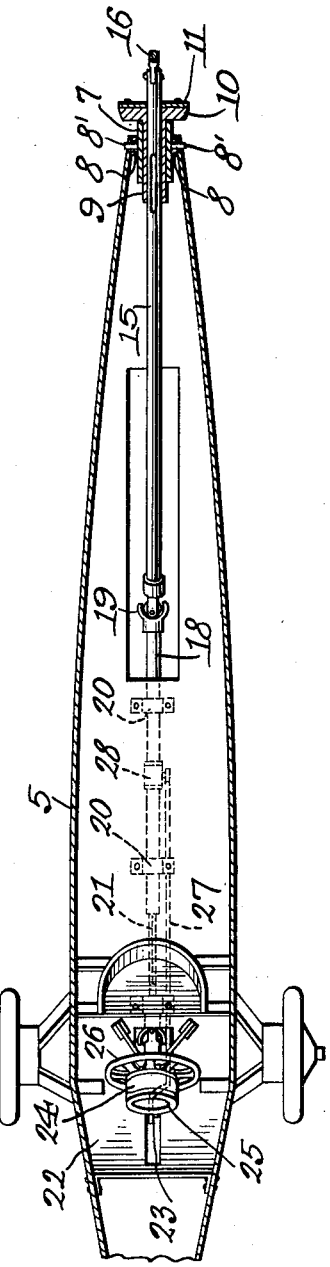
Figure 2 is a sectional view taken on line 2—2 of Figure 1.

Referring to the drawings in detail, the fuselage of an aeroplane, is indicated generally by the reference character 5, the wings of the aeroplane being indicated by the reference character 6.

Mounted at the rear of the fuselage, is a tubular bearing 7, which is pivotally mounted between the arms 8, at 8' so that the tubular bearing may swing vertically, for purposes to be hereinafter more fully described.

Mounted for rotary movement within the tubular bearing 7, is a bearing 9 formed with a head 10, to which the plate 11 of the stabilizer, is secured, so that rotary movement of the bearing 9, will result in a relative rotary movement of the stabilizer.

The stabilizer is indicated by the reference character 12, and has pivotal connection with the plate 11, at 13, the stabilizer being provided with a plate 14, that braces the stabilizer, and at the same time provides one of the sections of the stabilizer hinge.

Extending through the bearing 9, is a rod 15, to which the rod 16 is pivotally connected, the rod 16 being also pivotally connected with the stabilizer 12. Due to this construction, it will be seen that the stabilizer is pivotally connected with the plate 11, at a point beyond a horizontal line drawn longitudinally of the stabilizer, so that when the rod 15 is moved through its bearing, the stabilizer will be rocked, and moved to the desired position.

As clearly shown by Figure 8 of the drawings, the shaft 15 is formed with a groove into which one end of the set screw 17 extends, which set screw connects the tubular bearing member 7 with the shaft 15, in such a way that rotary movement of the shaft 15 will be directed to the tubular bearing member, to swing the stabilizer laterally to a position as shown in dotted lines in Figure 4 of the drawings, causing the aeroplane to bank and turn, to guide the aeroplane. Pivotally connected with the shaft 15, is a shaft 18, the connection being made through the medium of the universal joint 19, so that although the shaft 15 is disposed at an angle with respect to the shaft 18, the shafts may rotate in their bearings.

The shaft 18 operates in the bearings 20 that are secured to the under surface of the fuselage, the shaft 18 being provided with a bore, square in cross section and into which the shaft 21 extends, the shaft 21 being also square in cross section, so that it may slide longitudinally of the shaft 18, but direct rotary movement to the shaft 18, when the shaft 21 is rotated.

Supported within the aeroplane body or fuselage, is a guide plate 22, which is formed with a slot, through which the arm 23 of the control wheel support, extends. This control wheel support includes a bearing 24 through which the hollow shaft 25 of the wheel 26 extends.

Connected to one end of the arm 23, is a rod 27, that extends downwardly and laterally, where it connects with the shaft 18, through the medium of the collar 28, which permits of rotary movement of the shaft 18, with respect to the rod 27.

Located directly under the wheel 26, is a tubular bearing 29, through which the rod 30 extends, the rod having universal connection with the wheel 26, at 31, as well as universal connection with the shaft 21, at 32.

From the foregoing it will be seen that due to the construction shown and described, the operator may by tilting the wheel forwardly or rearwardly, move the stabilizer in a vertical plane so that the aeroplane will be directed upwardly or downwardly, but that by rotating the wheel 26, the stabilizer may be tilted laterally, to change the course of the aeroplane. It will further be seen that these two movements of the stabilizer may be accomplished simultaneously by the single wheel 26, making it unnecessary for the operator to operate independent means, for each movement of the stabilizer.

Having thus described the invention, what is claimed is:

1. In an aeroplane, a body portion, a tubular bearing pivotally mounted at the rear of the body portion, a bearing member mounted for rotary movement in said tubular bearing, a stabilizer pivotally mounted on the bearing, a shaft extended through the bearing member, means for connecting the shaft to the stabilizer, and means for operating the shaft to tilt the stabilizer.

2. In an aeroplane, a body portion, a bearing pivotally mounted at the rear of the body portion, said bearing having a head disposed exteriorly of the body portion, a plate secured to the head, a stabilizer, means for pivotally connecting the stabilizer to the plate, a shaft operating through the bearing, means for connecting the shaft to the stabilizer to swing the stabilizer, and adjust the stabilizer vertically, means for transmitting movement of the shaft to the bearing to move the stabilizer laterally when the shaft is rotated, and means for operating the shaft.

3. In an aeroplane, a body portion, and a tubular bearing mounted at the rear of the body portion, a hollow bearing member mounted for rotary movement within the tubular bearing, a plate secured to the hollow bearing member, one end of the plate extending beyond one edge of the tubular bearing and having a wide portion, a stabilizer, a wide hinge connecting the stabilizer to the wide portion of the plate, an operating rod mounted for sliding movement through the hollow bearing, means for transmitting rotary movement of the rod to the tubular member, whereby the stabilizer is tilted laterally, a rod pivotally connected to the operating rod, and having pivotal connection with the stabilizer, and said operating rod adapted to be moved longitudinally through the hollow bearing, tilting the stabilizer vertically.

CHARLES A. BLUME.